(12) United States Patent
Parkvall et al.

(10) Patent No.: US 9,253,731 B2
(45) Date of Patent: Feb. 2, 2016

(54) USER EQUIPMENT AND A METHOD THEREIN FOR TRANSMISSION POWER CONTROL OF UPLINK TRANSMISSIONS

(75) Inventors: Stefan Parkvall, Stockholm (SE); Per Burström, Luleå (SE); Erik Dahlman, Stockholm (SE); Jonas Fröberg Olsson, Ljungsbro (SE); George Jöngren, Sundbyberg (SE); Arne Simonsson, Gammelstad (SE); Stefano Sorrentino, Solna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 114 days.

(21) Appl. No.: 14/124,920

(22) PCT Filed: May 3, 2012

(86) PCT No.: PCT/SE2012/050462
§ 371 (c)(1),
(2), (4) Date: Dec. 9, 2013

(87) PCT Pub. No.: WO2012/177207
PCT Pub. Date: Dec. 27, 2012

(65) Prior Publication Data
US 2014/0113677 A1  Apr. 24, 2014

Related U.S. Application Data

(60) Provisional application No. 61/499,371, filed on Jun. 21, 2011.

(51) Int. Cl.
*H04B 7/00* (2006.01)
*H04W 52/14* (2009.01)
(Continued)

(52) U.S. Cl.
CPC .......... *H04W 52/146* (2013.01); *H04W 52/242* (2013.01); *H04W 52/244* (2013.01); *H04W 52/34* (2013.01)

(58) Field of Classification Search
CPC . H04W 52/146; H04W 52/242; H04W 52/34; H04W 52/325; H04W 72/0406; H04W 72/0413
USPC .......... 455/522, 69, 68, 67.11, 425, 450, 509, 455/422.1, 403, 445, 452.1, 127.1, 515, 455/525, 524, 500, 517; 370/310, 328, 329, 370/252, 318, 338, 343
See application file for complete search history.

(56) References Cited

U.S. PATENT DOCUMENTS

| | | | |
|---|---|---|---|
| 2007/0189234 A1* | 8/2007 | Heo et al. | 370/335 |
| 2008/0188260 A1* | 8/2008 | Xiao et al. | 455/522 |
| 2011/0038271 A1* | 2/2011 | Shin et al. | 370/252 |

FOREIGN PATENT DOCUMENTS

| | | |
|---|---|---|
| WO | 2010035966 A2 | 4/2010 |
| WO | 2010091425 A2 | 8/2010 |
| WO | 2012112577 A1 | 8/2012 |

OTHER PUBLICATIONS

Author Unknown, "3rd Generation Partnership Project: Considerations on CSI-RS Configuration Signaling (R1-105019)", 3rd Generation Partnership Project (3GPP TSG RAN WG1 Meeting #62), Item: 6.3.2.1, Aug. 23-27, 2010, 10 pages.

(Continued)

*Primary Examiner* — Keith Ferguson
(74) *Attorney, Agent, or Firm* — Withrow & Terranova, PLLC

(57) ABSTRACT

A UE and a method therein for transmission power control of uplink transmissions are provided. The method comprises receiving, through signalling a configuration indicating at least one reference signal, RS, and a reference transmission power level for each indicated RS. The method further comprises measuring received power of the indicated at least one RS, and for each measured received power, determining a pathloss, PL, based on the measured received power and the reference transmission power level for each measured received power. The method further comprises determining an uplink transmission power based on at least one determined PL.

18 Claims, 11 Drawing Sheets

(51) Int. Cl.
*H04W 52/24* (2009.01)
*H04W 52/34* (2009.01)

(56) References Cited

OTHER PUBLICATIONS

Author Unknown, "3rd Generation Partnership Project: CSI-RS Configuration/Reconfiguration in Distributed RRH Systems (R1-111593)", 3rd Generation Partnership Project (3GPP TSG RAN WG1 Meeting #65), Item: 6.3.2.2, May 9-13, 2011, 3 pages.

International Preliminary Report on Patentability for PCT/SE2012/050462, mailed Sep. 19, 2013, 22 pages.

International Search Report for PCT/SE2012/050462, mailed Jul. 27, 2012, 4 pages.

Written Opinion for PCT/SE2012/050462, mailed Jul. 4, 2013, 7 pages.

Author Unknown, "3rd Generation Partnership Project; Technical Specification Group Radio Access Network; Evolved Universal Terrestrial Radio Access (E-UTRA); Physical layer procedures (Release 10)," Technical Specification 36.213, 3GPP Organizational Partners, Jun. 2011, Version 10.2.0, 120 pages.

\* cited by examiner

USER EQUIPMENT AND A METHOD THEREIN FOR TRANSMISSION POWER CONTROL OF UPLINK TRANSMISSIONS

This application is a 35 U.S.C. §371 national phase filing of International Application No. PCT/SE2012/050462, filed May 3, 2012, the disclosure of which is incorporated herein by reference in its entirety.

TECHNICAL FIELD

The present disclosure relates to radio communication and in particular to uplink power control in radio communication.

BACKGROUND

In cellular or radio communication networks, user equipments, UEs, such as for example mobile telephones or laptops communicate with radio base stations, RBSs, or nodes over a Radio Access Network. Depending on several factors, for example the distances between the different UEs and the RBS/node; or the number of UEs currently transmitting signals to or receiving signals from the RBS; or the geographical conditions between the different UEs and the RBS, the UEs transmit signals to the RBS with different transmission powers. The different transmission powers of the UEs cause several problems or issues which need to be considered. One issue is that the higher the power, the higher is the strain on the battery of the UEs causing the batteries of UEs being depleted more rapidly. A further issue, which is much more complicated, is interference. As a UE transmits with relatively high transmission power, the more interference the UE causes other UEs in its vicinity and also to neighbouring RBSs or nodes.

In order to address these issues, dynamic control of the transmission power of the UE or mobile station has been introduced. Dynamic control of mobile radio station transmission power (sometimes referred to as uplink power control) is thus a common feature in cellular systems. Some objectives of uplink power control include: (a) attaining a sufficient received power and signal quality on the used uplink radio channel at the serving RBS, (b) limiting the received power (interference) at non-serving RBSs, (c) limiting the received power (interference) on other channels at the serving RBS, and (d) reducing the output power level to limit power consumption and save battery life in the mobile station.

Power control schemes can further be divided in to the categories 'closed-loop' and 'open-loop' depending on what type of measurement input is used. Closed-loop schemes make use of measurements on the same link direction that the power control applies to, i.e., on the uplink for uplink closed loop power control. Open-loop schemes make use of measurements on the opposite link direction, i.e., on the downlink for uplink open-loop power control. Closed-loop schemes are typically more accurate than open-loop schemes, but also require more control signalling overhead.

Improved support for heterogeneous network operations is part of the ongoing specification of 3GPP LTE (Long Term Evolution) Release-10, and further improvements are discussed in the context of new features for Release-11. In heterogeneous networks, a mixture of cells of differently sized and overlapping coverage areas are deployed. One non-limiting example is illustrated below where pico cells or pico RBSs are deployed within the coverage area of a macro RBS or macro cell. A pico RBS is an example of a low power RBS having a coverage area commonly referred to as a low power cell or in this example, a pico cell. A regular RBS is in the context of heterogeneous networks referred to as a macro RBS. The macro RBS has a coverage area referred to as a macro cell. In FIG. 1, one macro RBS 100 is shown having a coverage area or cell 101. Within the cell 101, three different low power RBSs or pico RBSs 110, 120 and 130 are deployed. Each of the pico RBSs has a corresponding cell 11, 121 and 131 respectively.

Throughout this disclosure, nodes or points in a network are often referred to as being of a certain type, e.g., "macro" or "pico". These types are only examples of such nodes or points and should not be interpreted as an absolute quantification of the role of the node/point but rather as a convenient way to illustrate the roles of different nodes/points relative each other. Thus, a description about macro and picos could, for example, just as well be applicable to an interaction between micros and femtos. Other non-limiting examples of low power nodes or points in heterogeneous networks are home base stations and relays. A large difference in output power (e.g. 46 dBm in macro cells and 30 dBm or less in pico cells) results in different interference situations as compared to networks where all base stations have the same output power.

Deploying low power nodes such as e.g. pico nodes or pico RBSs within a macro coverage area improves system capacity by cell splitting gains and also provides users, i.e. users of mobile stations or UEs, with a wide area experience of very high speed data access throughout the network. Heterogeneous deployments also cover traffic hotspots well. Hotspots are small geographical areas with high user densities served by, e.g., pico cells, and they represent an alternative deployment to denser macro networks.

A basic way to operate a heterogeneous network is to apply frequency separation between the different layers, i.e., the different macro and pico cells/RBSs operate on different non-overlapping carrier frequencies, and thereby avoid any interference between the layers. With no macro cell interference towards the under-laid cells, cell splitting gains are achieved when all resources can simultaneously be used by the under-laid cells. A drawback of operating layers on different carrier frequencies is that it may lead to resource-utilization inefficiency. For example, if there is low activity in the pico cells, it could be more efficient to use all carrier frequencies in the macro cell and then basically switch off the pico base stations. Nevertheless, the split of carrier frequencies across layers is typically done in a static manner.

Another way to operate a heterogeneous network is to share radio resources on the same carrier frequencies by coordinating transmissions across macro cells/RBSs and under laid cells/RBSs. In inter-cell interference coordination (ICIC), certain radio resources are allocated for the macro cells during some time period, and the remaining resources can be accessed by the under-laid cells without interference from the macro cell. Depending on the traffic situations across the layers, this resource split can change over time to accommodate different traffic demands. In contrast to the above split of carrier frequencies, this way of sharing radio resources across layers can be made more or less dynamic depending on the implementation of the interface between the nodes or points, e.g. the RBSs. In LTE, an X2 interface is specified that allows exchange of different types of information between radio base station nodes. One example of such information exchange is that an RBS can inform other RBSs that it will reduce its transmit power on certain resources.

Time synchronization between RBS nodes is required to ensure that ICIC across layers will work efficiently in heterogeneous networks. This is important for time domain-based ICIC schemes where resources are shared in time on the same carrier.

LTE uses Orthogonal Frequency-Division Multiplexing, OFDM, in the downlink and Discrete Fourier Transform, DFT,-spread OFDM in the uplink. The basic LTE physical communication resources can thus be seen as a time-frequency grid, as illustrated in the example in FIG. 2, where each resource element corresponds to one subcarrier during one OFDM symbol interval (on a particular antenna port).

In the time domain, LTE downlink transmissions are organized into radio frames of 10 ms, each radio frame including ten equally-sized subframes of 1 ms as illustrated in FIG. 3. A subframe is divided into two slots, each of 0.5 ms time duration.

The resource allocation in LTE is described in terms of resource blocks, where a resource block corresponds to one slot in the time domain and 12 contiguous 15 kHz subcarriers in the frequency domain. Two consecutive resource blocks (in time) represent a resource block pair and correspond to the time interval upon which transmission scheduling operates Transmissions in LTE are dynamically scheduled in each subframe, where the RBS transmits downlink assignments/uplink transmission grants to certain UEs (mobile radio stations in LTE) via the physical downlink control channel, PDCCH. The PDCCH signals are transmitted in the first OFDM symbol(s) in each subframe and span (more or less) the whole system bandwidth. A UE that has decoded a downlink assignment carried by a PDCCH knows which resource elements in the subframe that contain data aimed for the UE. Similarly, upon receiving an uplink transmission grant, the UE knows which time/frequency resources it should transmit upon. In LTE downlink, data is carried by the physical downlink shared channel, PDSCH, and in the uplink, the corresponding data channel is referred to as the physical uplink shared channel, PUSCH.

Demodulation of transmitted data requires estimation of the radio channel which is done by using transmitted reference symbols, RSs, i.e. symbols already known by the receiver. In LTE, cell-specific reference symbols, CRSs are transmitted in all downlink subframes, and in addition to assisting downlink channel estimation, they are also used for mobility measurements and for uplink power control performed by the UEs. LTE also supports UE-specific RS aimed only for assisting channel estimation for demodulation purposes.

FIG. 4 illustrates a mapping of physical control/data channels and signals onto resource elements within a downlink subframe. In this example, the PDCCHs occupy the first out of three possible OFDM symbols, so in this particular case the mapping of data could start at the second OFDM symbol. Since the CRS is common to all UEs in the cell, the transmission of CRS cannot be easily adapted to suit the needs of a particular UE. This is in contrast to UE-specific RS where each UE has RS of its own placed in the data region of FIG. 4 as part of the PDSCH.

The length of the control region, which can vary on subframe basis, is conveyed in the Physical Control Format Indicator Channel, PCFICH. The PCFICH is transmitted within the control region at locations known by UEs. After a UE decodes the PCFICH, it knows the size of the control region and in which OFDM symbol the data transmission starts.

Also transmitted in the control region is the Physical Hybrid-ARQ Indicator Channel. This channel carries ACK/NACK responses to a UE to inform if the uplink data transmission in a previous subframe was successfully decoded by the base station or not.

Before an LTE terminal, e.g. a UE, can communicate with an LTE network it first has to find and acquire synchronization to a cell or RBS within the network, i.e., performing cell search. Then it has to receive and decode system information needed to communicate with and operate properly within the cell or RBS, and finally access the cell by a random-access procedure.

In order to support mobility, a UE needs to continuously search for, synchronize to, and estimate the reception quality of both its serving cell/RBS and neighbour cells/RBSs. The reception quality of the neighbour cells, in relation to the reception quality of the current cell, is then evaluated in order to conclude if a handover (for UEs in connected mode) or cell re-selection (for UEs in idle mode) should be carried out. For UEs in connected mode, the handover decision is taken by the network based on measurement reports provided by the UEs. Examples of such reports are reference signal received power (RSRP) and reference signal received quality (RSRQ). Depending on how these measurements, possibly complemented by a configurable offset, are used, the UE can for example be connected to the cell/RBS with the strongest received power, the cell/RBS with the best path gain, or something between the two.

These selection strategies do not result in the same selected cell as the RBS output powers of cells of different type differ. This is sometimes referred to as link imbalance. For example, looking at FIG. 5, the output power of a pico RBS 510 or a relay is in the order of 30 dBm or less, while a macro RBS 500 can have an output power of 46 dBm. Consequently, even in the proximity of the pico cell, the downlink signal strength from the macro RBS 500 can be larger than that of the pico RBS 510. From a downlink perspective, it is often better to select cell/RBS based on downlink received power, whereas from an uplink perspective, it would be better to select cell/RBS based on the path loss.

In the above scenario, it might be better, from a system perspective, to connect to the pico cell/RBS 510 even if the macro downlink is much stronger than the pico cell downlink. However, ICIC across layers would be needed when UEs operate within the region of the UL border 511 and the DL border 512. This area is also referred to as the link imbalance zone. Some form of interference coordination across the cell layers is especially important for the downlink control signalling. If this interference situation is not handled appropriately, a UE in the region between the DL and UL borders in FIG. 5 and connected to the pico RBS 510 cannot receive the downlink control signalling from the pico RBS 510.

One approach for providing ICIC across layers is illustrated in FIG. 6, where an interfering macro RBS (downlink interference towards a pico cell/RBS) avoids scheduling unicast traffic in certain subframes implying that neither PDCCHs nor PDSCH occur in those subframes. In such way, it is possible to create low interference subframes, which can be used to protect pico users operating in the link imbalance zone, a pico user being a UE connected to the pico RBS. The macro RBS (MeNB) indicates via the backhaul interface X2 to the pico RBS (PeNB) which subframes it will avoid scheduling UEs within. The PeNB can then take this information into account when scheduling UEs operating within the link imbalance zone; such that these UEs are scheduled in subframes aligned with the low interference subframes at the macro layer, i.e. in interference protected subframes. However, pico cell UEs operating within the DL border can be scheduled in all subframes, i.e. in both protected and non-protected subframes.

In principle, data transmission in different layers could also be separated in the frequency domain by ensuring that scheduling decisions in the two cell layers are non-overlapping in the frequency domain, e.g., by exchanging coordination messages between the different RBSs. For control signalling, this is not possible according to the LTE specifications where control signalling spans the full bandwidth, and hence, a time-domain approach must be used.

One way to deploy a network is to let different transmission/reception points form separate cells. In other words, signals transmitted from or received at a point are associated with a cell-id that is different from the cell-id employed for other nearby points. Typically, each point transmits its own unique signals for broadcast (e.g., Physical Broadcast Channel, PBCH) and synchronisation channels (e.g., Primary Synchronisation Signal, PSS, and Secondary Synchronisation Signal SSS).

The concept of a point is often used in conjunction with techniques for coordinated multipoint, CoMP. In this context, a point corresponds to a set of antennas covering essentially the same geographical area in a similar manner. Thus a point might correspond to one of the sectors at a site, but it may also correspond to a site having one or more antennas all intending to cover a similar geographical area. Often, different points represent different sites. Antennas correspond to different points when they are sufficiently geographically separated and/or having antenna diagrams pointing in sufficiently different directions. CoMP techniques introduce dependencies in the scheduling or transmission/reception among different points, in contrast to conventional cellular systems where a point from a scheduling point of view is operated more or less independently from the other points.

This typical strategy of one cell-id per point is depicted in FIG. 7 for a heterogeneous deployment where a number of low power (pico) points or RBS are placed within the coverage area of a higher power macro point or RBS. Similar principles also apply to classical macro-cellular deployments where all points have similar output power and perhaps placed in a more regular fashion than what may be the case for a heterogeneous deployment. In FIG. 7, one macro point or macro RBS 700 is illustrated having a coverage area or cell 701. The cell 701 has cell-id 1. Within macro cell 701, three different low power points/RBSs 710, 720 and 730 are deployed. Each low power point/RBS has a coverage area or pico cell 711, 721 and 731 respectively. The three different pico cells have their own specific cell-id, i.e. pico cell 711 has cell-id 2, pico cell 721 has cell-id 3 and pico cell 731 has cell-id 4.

An alternative to the typical deployment strategy is to instead let all the UEs within the geographical area outlined by the coverage of the high power macro point be served with signals associated with the same cell-id. In other words, from a UE perspective, the received signals appear coming from a single cell. Looking at FIG. 7, all cells 701, 711, 721 and 731 have the same cell-id, e.g. cell-id 1. Only one macro point/RBS 700 is shown, and other macro points would use different cell-ids (corresponding to different cells) unless they are co-located at the same site (corresponding to other sectors of the macro site). In the latter case of several co-located macro points, the same cell-id may be shared across the co-located macro-points and those pico points that correspond to the union of the coverage areas of the macro points. Synchronisation, Broadcast Channel, BCH, and control channels are all transmitted from the high power point while data can be transmitted to a UE also from low power points by using shared data transmissions PDSCH relying on UE specific RS. Such an approach has benefits for those UEs capable of PDSCH based on UE-specific RS while UEs only supporting CRS for PDSCH (which is likely to at least include all LTE Release 8/9 UEs for Frequency Division Duplex, FDD) must settle with the transmission from the high power point and thus will not benefit in the downlink from the deployment of extra low power points.

The single cell-id approach is geared towards situations in which there is fast backhaul communication between the points associated to the same cell. An example case might be an RBS serving one or more sectors on a macro level as well as having fast fibre connections to remote radio units (RRUs) playing the role of the other points sharing the same cell-id. Those RRUs could represent low power points with one or more antennas each. Another example is when all the points have a similar power class with no single point having more significance in than the others. The RBS handles the signals from all RRUs in a similar manner.

An advantage of the shared cell approach compared with the typical approach is that the typical handover procedure between cells/RBSs only needs to be invoked on a macro basis. Another advantage is that interference from CRS are greatly reduced since CRS do not have to be transmitted from every point. There is also greater flexibility in coordination and scheduling among the points sot the network can avoid relying on the inflexible concept of semi-statically configured "low interference" subframes, as illustrated in FIG. 6. A shared cell approach also allows decoupling of the downlink with the uplink so that for example path loss based reception point selection can be performed in uplink while not creating a severe interference problem for the downlink, where the UE may be served by a transmission point different from the point used in the uplink reception. Typically, this means that the UE's uplink transmissions are received by a pico point, while the UE receives downlink transmissions from the macro point.

According to 3GPP Release-10 LTE, uplink power control (UL PC) is performed by estimating a path loss (PL) term and combining it with various UE-specific and cell-specific power offset terms. An example power control (PC) formula from Rel-10 is in the form $$P=\min(P_{max}, 10\log 10(M+P_0+\alpha*PL+C))[dBm] \quad (1)$$

where $P_{max}$ represents a cap on the output power (in dBm), M represents the scheduled UL bandwidth, $P_0$ is a UE- and/or cell-specific power offset, $\alpha$ is a cell-specific fractional path loss compensation factor, PL is an estimate of the path loss performed by the UE and C is a correction term possibly obtained as a combination of multiple power correction terms, possibly including closed-loop power control correction terms.

The UE estimates the path loss PL based on the difference (in dB) between the received power for cell-specific common reference signals (CRS) and the nominal power of such reference signals $$PL = \text{referenceSignalPower} - \text{higher layer filtered RSRP} \quad (2)$$

where referenceSignalPower is configured by higher layer signalling and RSRP is defined for the reference serving cell. Filtering of the RSRP may be configured by higher layer signalling and performed by the UE. The serving cell chosen as the reference serving cell and used for determining referenceSignalPower and higher layer filtered RSRP is configured by the higher layer parameter pathlossReferenceLinking.

A problem with uplink power control is that decoupling the downlink operations from the uplink operations does not apply to the UE's open loop part of the output power setting because the UE regulates its transmit power based on the CRS's and a reference power level transmitted by the RBS. In some cases, the open loop part of the power control may completely determine the output power, e.g., when the UE is only using open-loop power control. In case the UE is served by a macro RBS/cell in the downlink, the RSRP measurement that determines transmit power will not take the pico nodes/ RBSs into account, which means that the UE will transmit with a power level that causes the received power in the pico node/RBS to be far above what is determined by the UE-specific and/or cell-specific power offset P0. The network may then employ closed loop power control to steer the UE's output power to a value that it sees fit. This can be done by sending transmit power commands, TPCs, in uplink grants to the UE. The TPC is a two-bit instruction and can be either an absolute setting or an accumulative value. The accumulative value, which would be required to control the power over a large dynamic range, takes one of the four values [−1, 0, 1, 2] dB.

Due to the uneven output powers of the different nodes/ RBSs and since the CRS are shared between macro and pico nodes/RBSs in a shared cell-ID setting, the UE power control will be detrimental towards achieving area splitting gains. Because the macro node/RBS has a much higher output power than pico nodes/RBSs, UEs that could be served by a pico RBS in the uplink will too often regulate their transmit power towards the macro RBS even though the macro RBS/ cell has a much lower path gain that the pico RBS/cell. This power output will likely create excessive interference within the cell and thereby degrade the possibility of multi-user access (e.g. SDMA) within the cell. Also, the UE power consumption will be unnecessarily high if a too high output power is used.

SUMMARY

The object is to obviate at least some of the problems outlined above. In particular, it is an object to provide a UE and a method therein for transmission power control of uplink transmissions, wherein the UE determines a pathloss for at least one indicated RS based on a measurement of the RS and a reference transmission power level. These objects and others may be obtained by providing a UE and a method in a UE according to the independent claims attached below.

According to an aspect, a method in a UE for transmission power control of uplink transmissions is provided. The method comprises comprising receiving, through signalling a configuration indicating at least one reference signal, RS, and a reference transmission power level for each indicated RS. The method further comprises measuring received power of the indicated at least one RS, and for each measured received power, determining a pathloss, PL, based on the measured received power and the reference transmission power level for each measured received power. The method further comprises determining an uplink transmission power based on at least one determined PL.

According to an aspect, a UE configured for transmission power control of uplink transmissions is provided. The UE comprises a receiving module adapted to receive a configuration indicating at least one reference signal, RS and a reference transmission power level for each indicated RS. The UE further comprises a measuring module adapted to measure received power of the indicated at least one RS; and a determining module adapted to determine a pathloss, PL, based on the measured received power and the reference transmission power level for each measured received power. The determining module further is adapted to determine an uplink transmission power based on at least one determined PL.

The UE and the method therein for transmission power control of uplink transmissions have several advantages. For example, the UE decouples uplink power control from the downlink CRSs and provides a flexible way for the network to control how the UEs should set the transmit power. Another advantage is that significant area splitting gains may be attained by controlling the transmit power towards the node that has the lowest (or at least a lower) path loss. Furthermore, power control may be based on freely-configurable UE-specific equivalent channels. Transmit power may be reduced and interference to the own and other cells may be minimized, enabling increased possibilities for spatial division multiple access and improved UE battery lifetime.

BRIEF DESCRIPTION OF DRAWINGS

Embodiments will now be described in more detail in relation to the accompanying drawings, in which.

DETAILED DESCRIPTION

Briefly described, a UE and a method therein for transmission power control of uplink transmissions are provided, wherein the UE receives a configuration message indicating at least one reference signal, RS, to be measured by the UE, wherein the UE performs measurements on the indicated RS(s) and determines an uplink transmission power based on the performed measurements.

Figure 1:
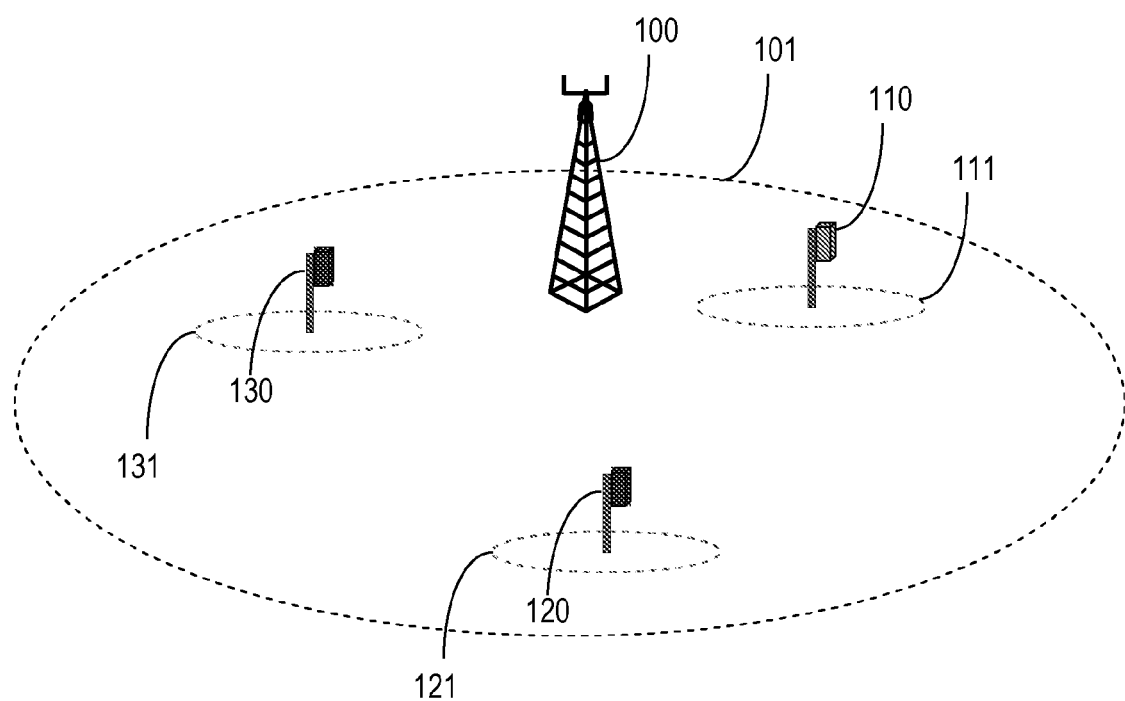
FIG. 1 is an architecture overview of a macro and low power RBS deployment.
Figure 2:
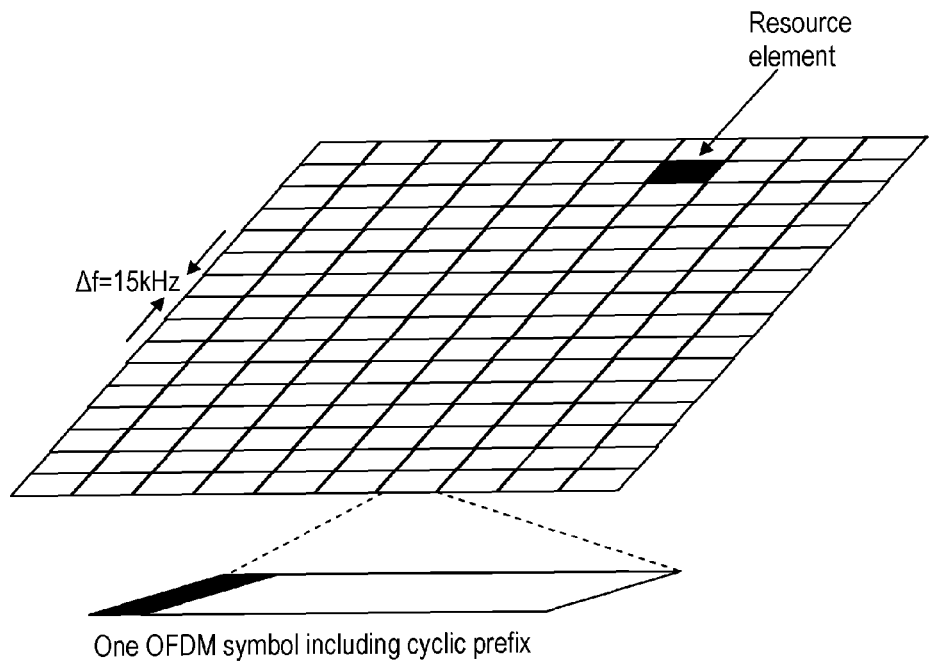
FIG. 2 is an exemplifying LTE downlink physical resource.
Figure 3:
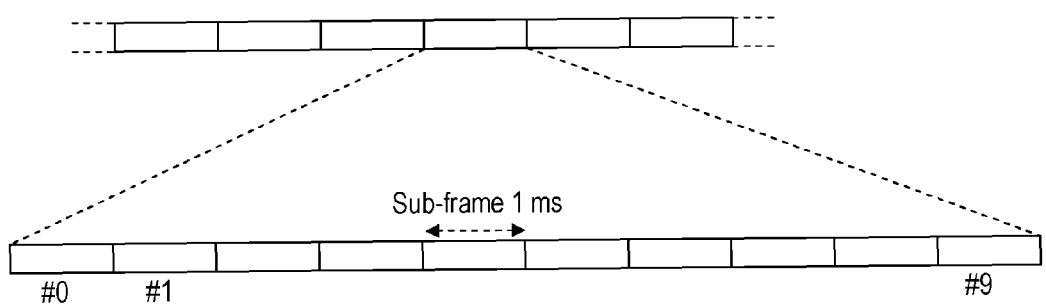
FIG. 3 illustrates the LTE time-domain structure.
Figure 4:
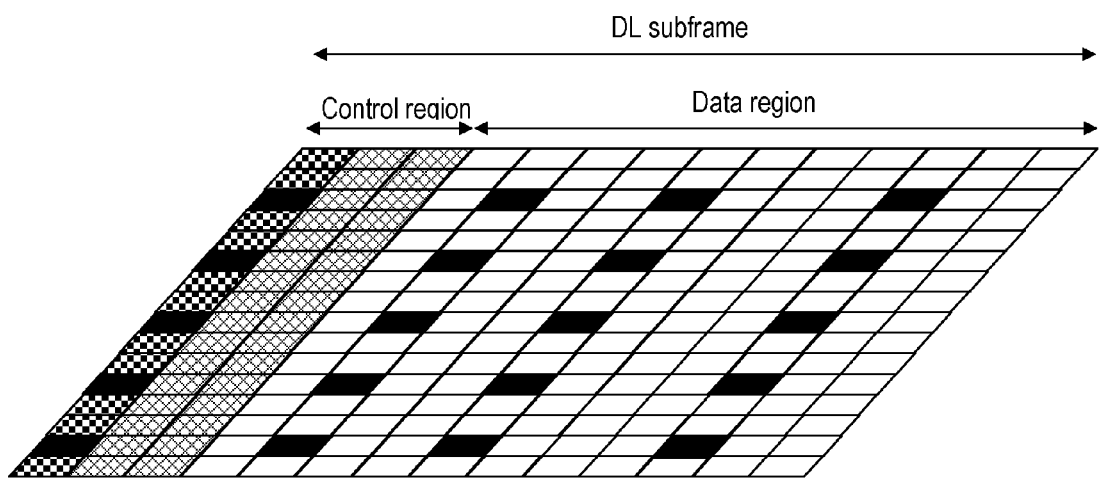
FIG. 4 illustrates mapping of LTE physical control channels, data channels and cell specific reference signals within a downlink subframe.
Figure 5:
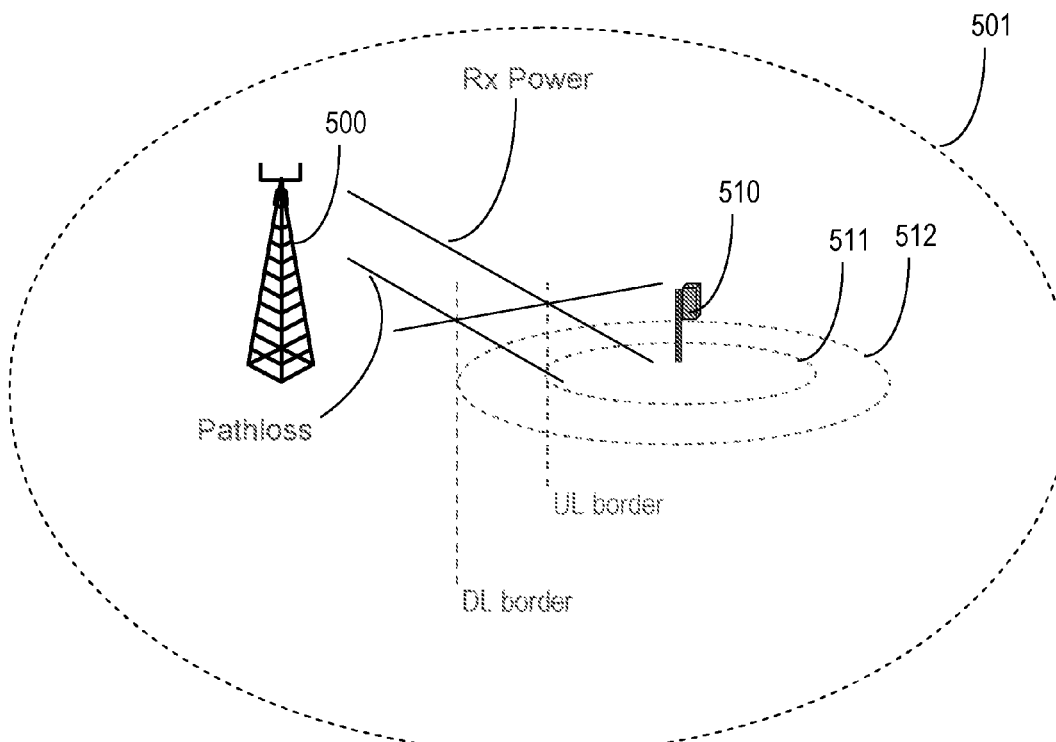
FIG. 5 illustrates uplink and downlink coverage in a heterogeneous network deployment.
Figure 6:
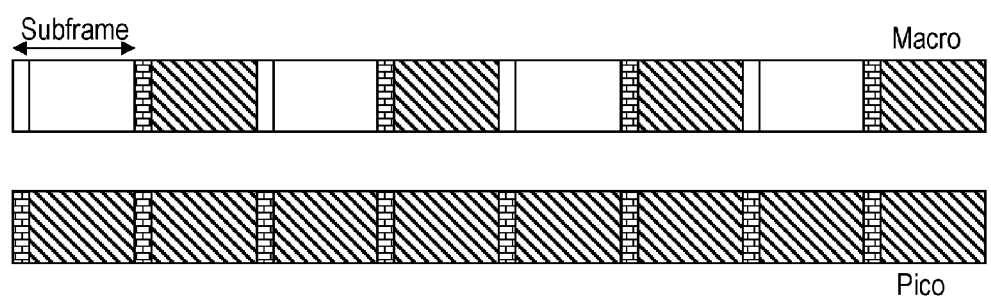
FIG. 6 illustrates ICIC using low interference subframes in downlink.
Figure 7:
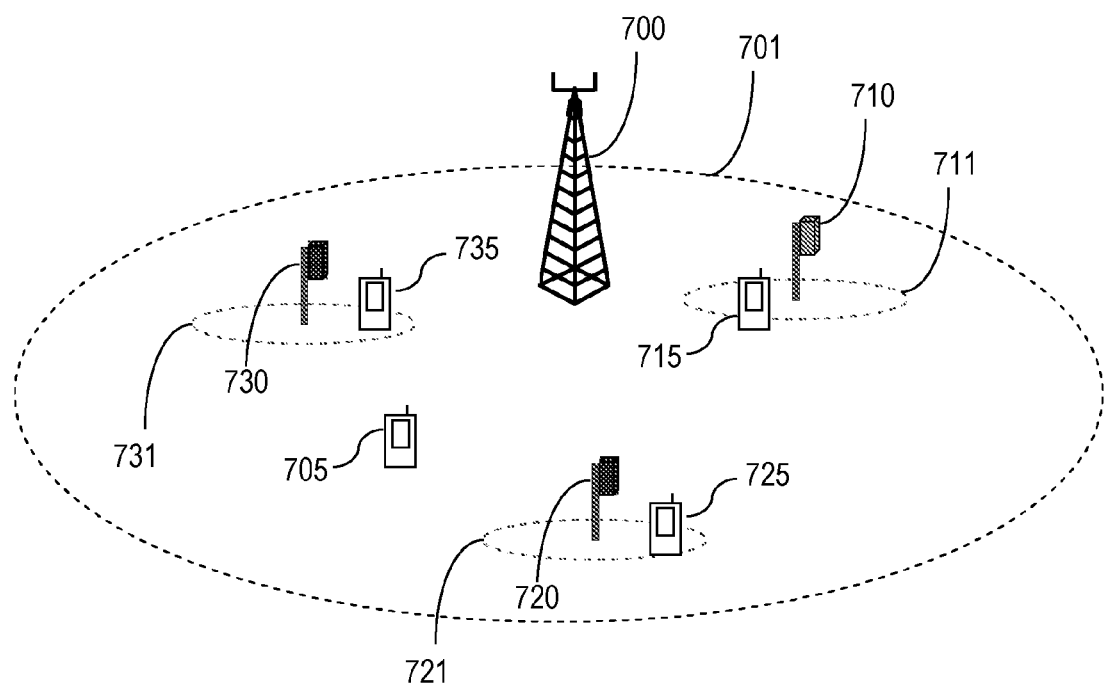
FIG. 7 is an exemplifying heterogeneous network deployment.
Figure 8A:
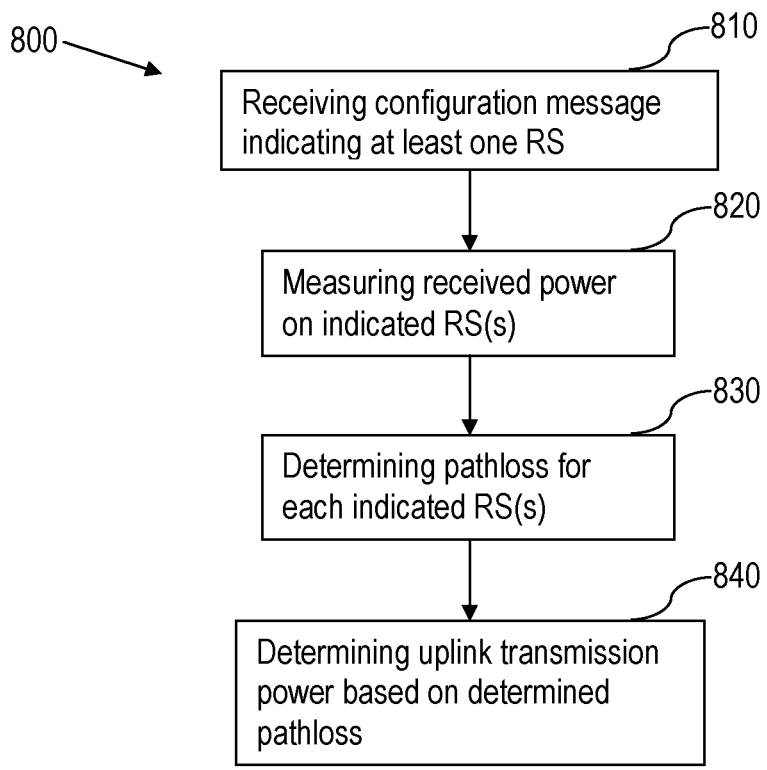
FIG. 8a is a flowchart of a method in a UE for transmission power control of uplink transmissions according to an exemplifying embodiment.

Turning now to FIG. 8a, an exemplifying embodiment of a method in a UE for transmission power control of uplink transmissions is illustrated by means of a flowchart.

FIG. 8a illustrates that the method 800 in a UE for transmission power control of uplink transmissions comprising receiving 810, through signalling a configuration indicating at least one reference signal, RS, and a reference transmission power level for each indicated RS. The method further comprises measuring 820 received power of the indicated at least one RS, and for each measured received power, determining 830 a pathloss, PL, based on the measured received power and the reference transmission power level for each measured received power. The method further comprises determining 840 an uplink transmission power based on at least one determined PL.

In more detail, according to the method, the UE receives, through signalling, a configuration indicating at least one reference signal, RS, to be measured by the UE. The UE also receives a reference transmission power level for each indicated RS. This configuration is in one example transmitted by a macro node or RBS. Either, the macro node/micro node/RBS is currently serving the UE meaning that the UE is connected to the macro node/RBS, or the UE is served by one of a possibly plurality of low power nodes/RBSs, e.g. pico node/RBSs, which are deployed within the coverage area of the macro node/RBS, i.e. the macro cell. When the involved nodes are controlled by the same RBS, or eNB, such in the case of pico RBSs deployed as RRUs, all information is available in a single node. If the nodes are stand alone RBSs, information can be exchanged over the X2 interface between the nodes thereby obtaining necessary information.

Once the UE receives the configuration, the UE knows which RSs that the UE should measure. The UE is also informed for each of the possibly plurality of RSs, a respective reference transmission power level for each indicated RS. Each RS is generally transmitted from a node/RBS (macro or low power) using a certain transmission power level. The transmission power level may be individual for each RS. By means of the configuration, the UE is informed which different RSs, one or more, it should measure and the respective transmission power level with which each respective RS is transmitted.

The UE then measures the received power level of each of the indicated RSs. Based on the measured received power level and the reference power level, i.e. the power level with which the RS was transmitted, the UE determines a PL for each of the indicated RSs. The PLs is in an example determined by calculation. In other words, for each indicated RS, the UE measures the received power level of that RS and determines the PL for that RS based on the measured received power level and based on the indicated reference power level.

Thereafter, the UE determines an uplink transmission power based on at least one determined PL for each of the indicated RS(s).

The method has several advantages. For example, the method in the UE decouples uplink power control from the downlink CRSs and provides a flexible way for the network to control how the UEs should set the transmit power. Another advantage is that significant area splitting gains may be attained by controlling the transmit power towards the node that has the lowest (or at least a lower) path loss. Furthermore, power control may be based on freely-configurable UE-specific equivalent channels. Transmit power may be reduced and interference to the own and other cells may be minimized, enabling increased possibilities for spatial division multiple access and improved UE battery lifetime.

According to an embodiment, determining an uplink transmission power, comprises determining a combined PL based on all determined PLs and determining a transmission power based on the combined PL.

Once the UE has determined the PLs for each indicated RS, the UE combines the determined PLs in order to determine an uplink transmission power. The determined PLs are individual for each respective RS, and are most likely different from each other. Assuming a plurality of RSs has been measured with respect to received power level and consequently a plurality of PLs has been determined, the PLs typically span from one PL value which is the lowest of them all and one PL value which is the highest of them all, with the remaining PL values being in between the highest and the lowest value.

According to an embodiment, the combined PL is selected to be the minimum PL among the determined PLs.

As described above, the determined PLs typically span from one having the lowest value to one having the highest value with a plurality of PL values in between. The higher the PL, the more of the transmitted signal is lost, or the more the transmitted signal is attenuated before the signal is received by the UE. The lower the PL, the less of the transmitted signal is lost or the less the transmitted signal is attenuated before the signal is received by the UE. If the PL is low, then the conditions of the channel are favourable as the transmitted signal is not attenuated as much as if the PL is high. This means that less transmission power is required in order to ensure that a transmitted signal is correctly received by a receiver, i.e. the node or the RBS (macro or pico).

In an example, the RS or RSs comprise RS(s) that correspond to RS patterns also used for Channel State Information, CSI, feedback.

CRSs are not the only reference symbols available in LTE. $3^{rd}$ Generation Partnership Project, 3GPP, LTE Release-10 introduced a new RS concept with separate, UE-specific RS for demodulation of PDSCH and RS for measuring the channel for the purpose of channel state information, CSI, feedback from the UE. The latter is referred to as CSI-RS. CSI-RS are not transmitted in every subframe, and they are generally sparser in time and frequency than RS used for demodulation. CSI-RS transmissions may occur every $5^{th}$, $10^{th}$, $20^{th}$, $40^{th}$, or $80^{th}$ subframe according to an RRC configured periodicity parameter and an RRC configured subframe offset.

A UE operating in "connected mode" can be requested by an RBS to perform CSI reporting, e.g., reporting a suitable rank indicator (RI), one or more pre-coding matrix indices (PMIs), and a channel quality indicator (CQI). Other types of CSI may be used such as explicit channel feedback and interference covariance feedback. The CSI feedback assists an RBS in scheduling, including deciding the subframe and resource blocks (RBs) for the transmission, which transmission scheme/precoder to use, as well as provides information for a user bit rate for the transmission (link adaptation). In LTE, both periodic and aperiodic CSI reporting are supported. In the case of periodic CSI reporting, the terminal, i.e. the UE, reports the CSI measurements on a configured periodical time basis on the physical uplink control channel, PUCCH, whereas with aperiodic reporting the CSI feedback is transmitted on the physical uplink shared channel, PUSCH at pre-specified time instants after receiving the CSI grant from the base station. With aperiodic CSI reports, the RBS can thus request CSI reflecting downlink radio conditions in a particular subframe.

Figure 9A:
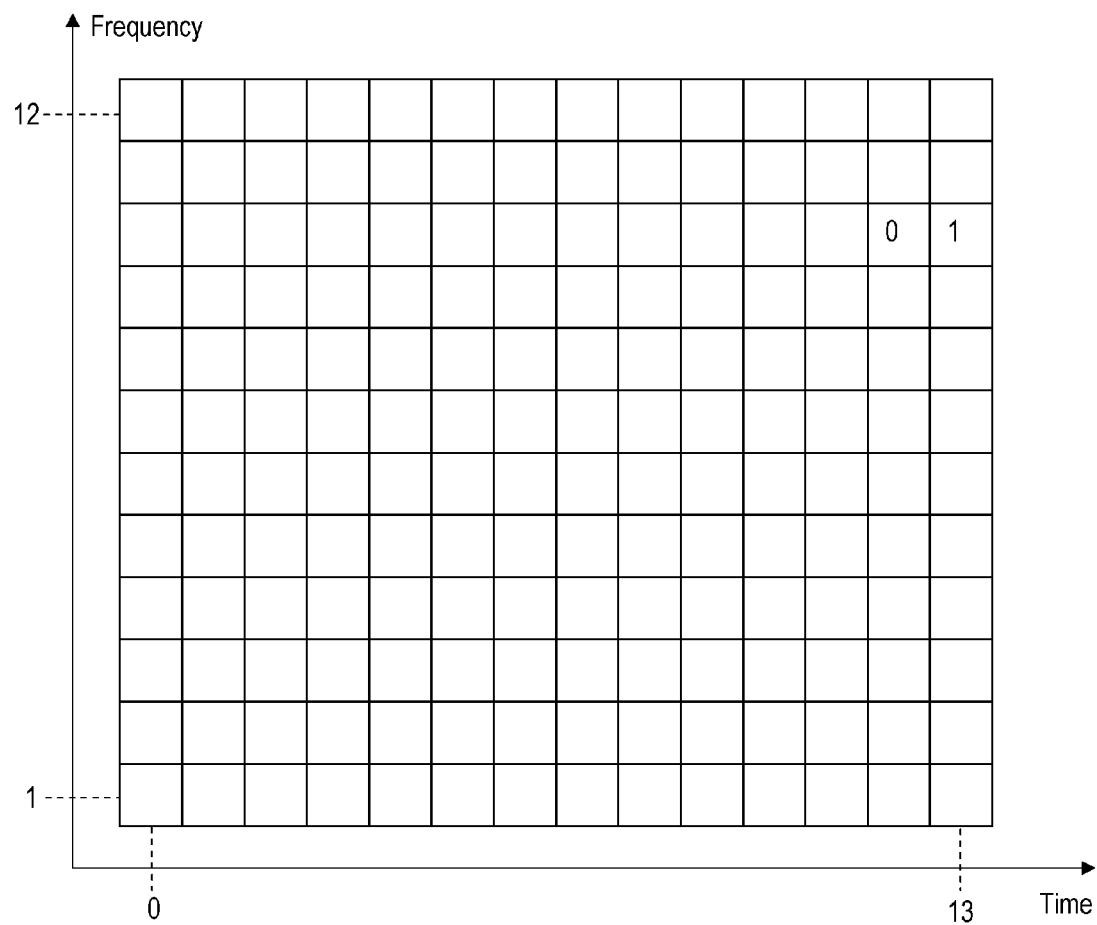
FIG. 9a is a schematic illustration of a minimum scheduling unit comprising two resource blocks RBs with two CSI RS ports, according to an exemplifying embodiment.
Figure 9B:
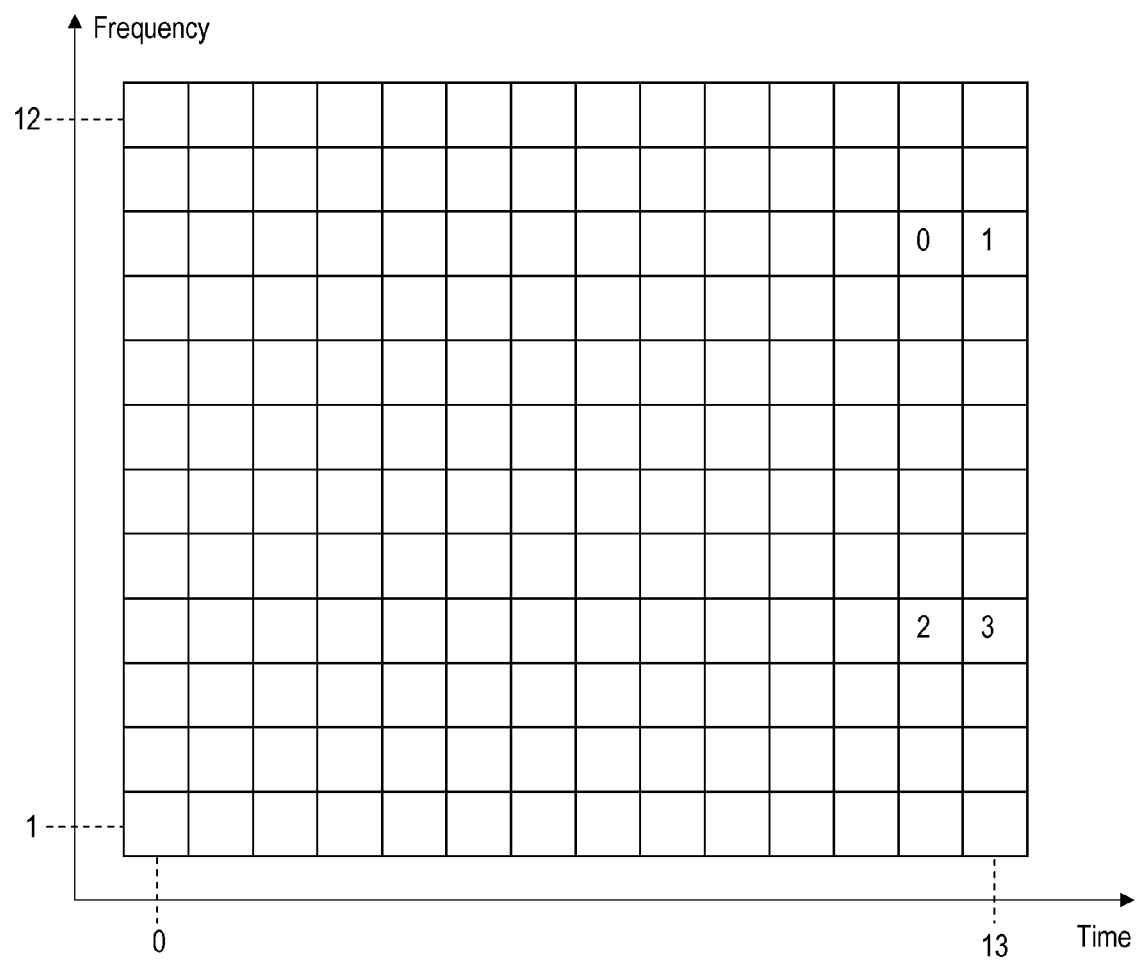
FIG. 9b is a schematic illustration of a minimum scheduling unit comprising two resource blocks RBs with four CSI RS ports, according to an exemplifying embodiment.
Figure 9C:
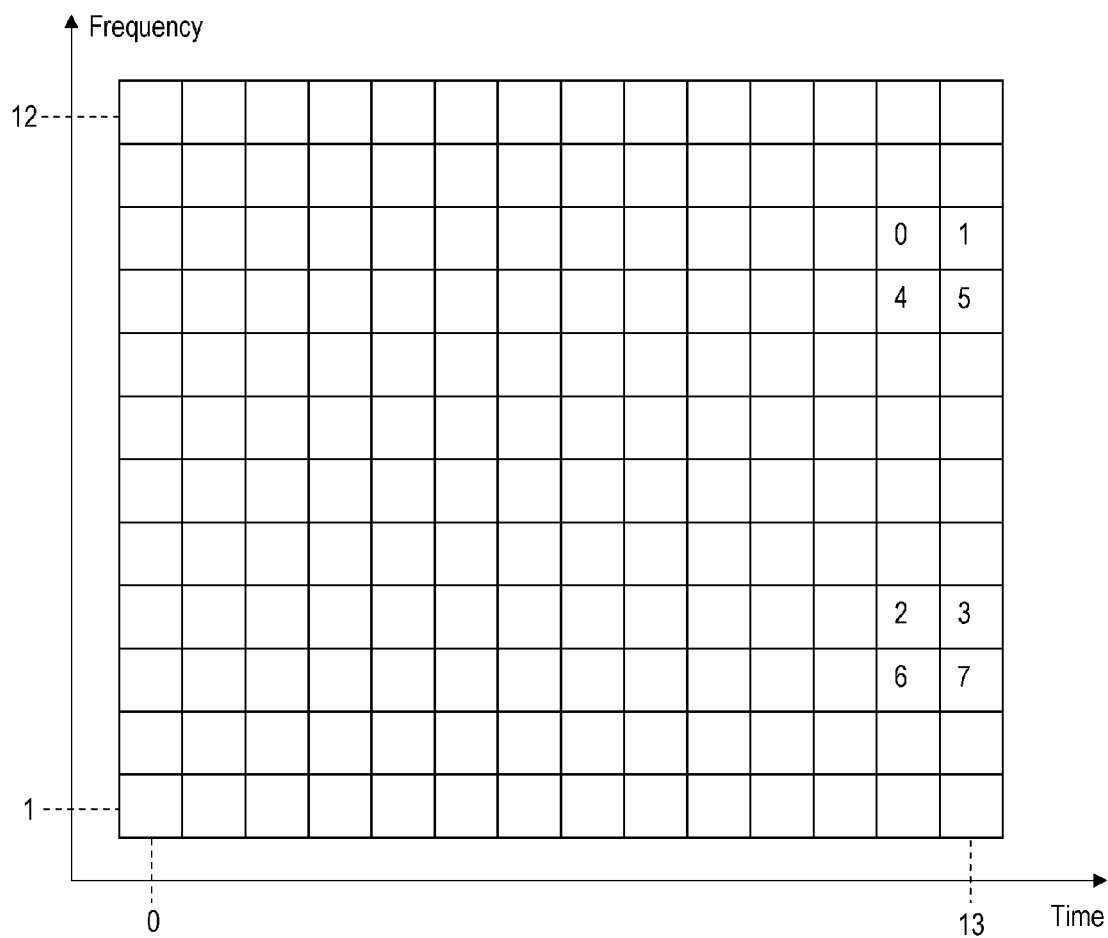
FIG. 9c is a schematic illustration of a minimum scheduling unit comprising two resource blocks RBs with eight CSI RS ports, according to an exemplifying embodiment.

A detailed illustration of which resource elements within a resource block pair that may potentially be occupied by UE-specific RS and CSI-RS is provided in FIGS. 9*a-c*. The CSI-RS uses an orthogonal cover code of length two to overlay two antenna ports on two consecutive resource elements (REs). As seen, many different CSI-RS patterns are available. For the case of 2 CSI-RS antenna ports, there are 20 different patterns within a subframe. The corresponding number of patterns is 10 and 5 for 4 and 8 CSI-RS antenna ports, respectively. For TDD, some additional CSI-RS patterns are available.

FIGS. 9a, 9b and 9c are schematic illustrations of a minimum scheduling unit comprising two resource blocks RBs with different number of CSI RS ports.

One single resource block comprises one slot which is 0.5 ms long and comprises twelve subcarriers. Consequently, a minimum scheduling unit is one ms long (two slots) and comprises twelve subcarriers. The scheduling unit comprises 14*12=168 resource elements, REs, wherein one RE is capable of carrying one reference symbol. Typically, one scheduling unit comprises a plurality of reference symbols.

The reference signals may used by the UE(s) for demodulation and to measure different parameters. The measuring is e.g. performed by the UE(s) with a periodicity of five subframes and there is one RE per antenna port and the RBs are e.g. punctured into the Physical Downlink Shared Channel, PDSCH. There may be two, four, or eight CSI RS ports. The reuse factor may be kept high through subframe offset, intrasubframe Orthogonal Frequency-Division Multiplexing, OFDM, symbol shift and frequency shift.

FIG. 9a is a schematic illustration of a minimum scheduling unit comprising two resource blocks RBs with two CSI RS ports.

FIG. 9b is a schematic illustration of a minimum scheduling unit comprising two resource blocks RBs with four CSI RS ports.

FIG. 9c is a schematic illustration of a minimum scheduling unit comprising two resource blocks RBs with eight CSI RS ports.

The term CSI-RS resource corresponds to a particular pattern present in a particular subframe. Thus, two different patterns in the same subframe or the same CSI-RS pattern but in different subframes in both cases constitute two separate CSI-RS resources.

The CSI-RS patterns may also correspond to so-called zero-power CSI-RS, also referred to as muted resource elements (REs). Zero-power CSI-RS corresponds to a CSI-RS pattern whose REs are silent, i.e., there is no transmitted signal on those REs. Such silent patterns are configured with a resolution corresponding to the 4 antenna port CSI-RS patterns. Hence, a smallest unit to silence corresponds to four REs.

The purpose of zero-power CSI-RS is to raise the SINR for CSI-RS in a cell by configuring zero-power CSI-RS in interfering cells so that the REs otherwise causing the interference are silent. Thus, a CSI-RS pattern in a certain cell is matched with a corresponding zero-power CSI-RS pattern in interfering cells. Raising the SINR level for CSI-RS measurements is particularly important in applications such as coordinated multi point (CoMP) or in heterogeneous deployments. In CoMP, the UE is likely to need to measure the channel from non-serving cells and interference from the much stronger serving cell would in that case be devastating. Zero-power CSI-RS is also needed in heterogeneous deployments where zero-power CSI-RS in the macro-layer is configured so that it coincides with CSI-RS transmissions in the pico-layer. This avoids strong interference from macro nodes when UEs measure the channel to a pico node.

The PDSCH is mapped around the REs occupied by CSI-RS and zero-power CSI-RS so it is important that both the network and the UE assume the same CSI-RS/zero power CSI-RS configuration or else the UE is unable to decode the PDSCH in subframes containing CSI-RS or their zero-power counterparts.

In the uplink, so-called sounding reference symbols (SRS) may be used for acquiring CSI about the uplink channel from the UE to the receiving nodes. If SRS are used, they are transmitted on the last DFT spread OFDM symbol of a subframe. SRS can be configured for periodic transmission as well for dynamic triggering as part of the uplink grant. The primary use for SRS is to aid the scheduling and link adaptation in the uplink. But for TDD, SRS is sometimes used to determine beamforming weights for the downlink by exploiting the fact that the downlink and uplink channels are the same when the same carrier frequency is used for downlink and uplink (channel reciprocity).

While PUSCH carries data in the uplink, PUCCH is used for control in the uplink. PUCCH is a narrowband channel using an RB pair, where the two RBs are on opposite sides of the potential scheduling bandwidth. PUCCH is used for conveying ACK/NACKs, periodic CSI feedback, and scheduling request to the network.

The CSI-RS are used for channel state information feedback from a combination of different nodes or RBSs. The CSI-RS are designed with flexibility and resource orthogonality in mind. For example, all nodes or RBSs belonging to a shared cell-ID cell may be configured to use different CSI-RS resources. In this case, the resources are orthogonal within the cell, meaning that measurements made on them have the potential to be very reliable. A UE is configured to measure on all or a set of these CSI-RS resources to estimate PL to the different nodes or RBSs. The set may consist of only one CSI-RS resource, corresponding to transmissions from one node or RBS. The set may also include CRSs as a baseline. In any case, the network signals reference output powers corresponding to the transmissions of the included CSI-RS resources and/or CRS to the UE, enabling the UE to calculate the PL to all nodes. The UE may then use this PL estimation in its power control formula to regulate its power towards the node or RBS with the lowest PL. In this way, transmit power may be reduced and interference to the own and other cells may be reduced or minimized, enabling increased possibilities for spatial division multiple access and improved UE battery lifetime.

In an example, the configuration message indicates at least two RSs to be measured by the UE and a respective reference transmission power level for each of the at least two RSs, wherein the respective RS is associated with a respective separate node, wherein at least two PLs are determined, one for each received RS, and wherein a respective uplink transmission power associated with the at least two RSs is determined based on the determined PLs In an example, the configuration message indicates two RSs to be measured by the UE and a respective reference transmission power level for each of the at least two RSs. The two RSs are denoted RS-A and RS-B. RS-A is indicated having a reference transmission power level denoted RTPL-A and RS-B is indicated having a reference transmission power level denoted RTPL-B. The UE then measures the received power level of the respective RS-A and RS-B, denoted RPL-A and RPL-B. Once the UE has performed these measurements, the UE determines a respective pathloss PL-A and PL-B. PL-A is determined based on RTPL-A and RPL-A. PL-B is determined based on RTPL-B and RPL-B. The UE then selects the lowest PL and determines an uplink transmission power towards an RBS or node which transmitted the RS associated with the lowest PL.

According to an embodiment, determining an uplink transmission power comprises determining, for each indicated RS, an uplink power based on at least one determined PL, each determined power is towards a respective node.

According to still an embodiment, determining an uplink transmission power towards one of the nodes comprises combining the determined PLs and then determining the uplink transmission power based on the combined PL.

According to yet an embodiment, the combined PL is obtained by identifying the minimum PL among the measured PLs, wherein the method further comprises transmitting 855 in uplink, to a node associated with the lowest PL using the determined uplink transmission power based on the minimum PL.

Figure 8B:
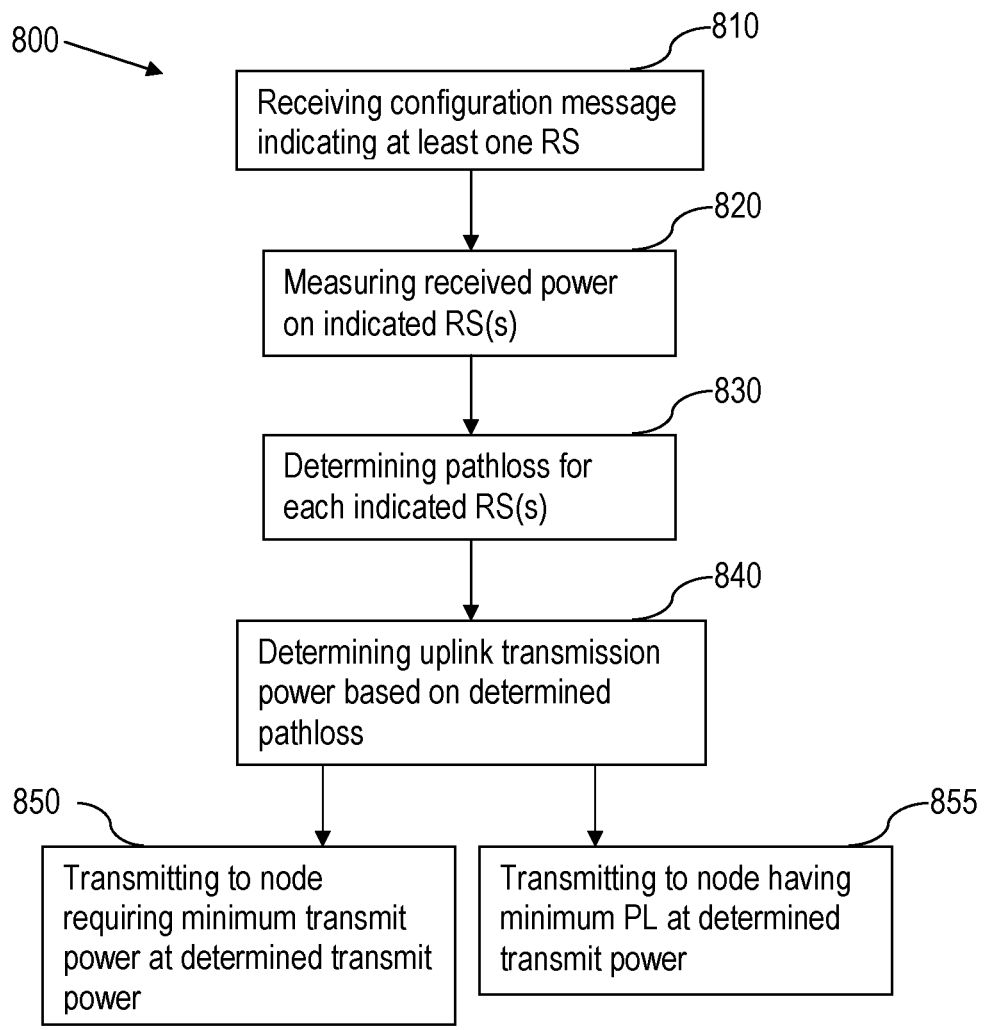
FIG. 8b is a flowchart of a method in a UE for transmission power control of uplink transmissions according to an exemplifying embodiment.

As explained above, the UE determines a respective PL for each indicated RS in the received configuration message. Once the UE has determined the respective PLs for each of the RSs, the UE transmits in uplink to the node or RBS being associated with the RS suffering from the minimum PL at a transmission power level, which is determined by the UE based on the minimum PL. This is illustrated in FIG. 8b, which is a flowchart of a method in a UE for transmission power control of uplink transmissions according to an exemplifying embodiment.

According to an embodiment, determining an uplink transmission power towards one of the nodes comprises combining and weighting the respective transmission powers and then determining the uplink transmission power towards one of the nodes based on the combined and weighted transmission power.

In still an embodiment, the combined and weighted transmission power is obtained by identifying the minimum transmission power among the respective transmission powers, wherein the method further comprises transmitting 850 in uplink, to the node associated with the minimum transmission power at the determined transmission power based on the minimum transmission power.

The UE may identify the minimum PL among all the determined PLs and from that identified minimum PL determine a transmission power level in uplink. Alternatively, the UE may determine a respective uplink transmission power for each determined PL and from the determined respective uplink transmission powers, and from all the determined respective uplink transmission powers identify the minimum uplink transmission power, see FIG. 8b.

According to yet an embodiment, the combined and weighted transmission power is obtained by linear sum the measured PLs. This can be feasible when CoMP is used and the transmission can be received and combined from several nodes.

According to an embodiment, the combined and weighted transmission power is based further based on number of antennas or receiver type at each RS transmission point.

According to still an embodiment, the number of antennas and receiver type is received in the configuration message.

According to an embodiment, the RS or the RSs are further used for CSI feedback.

A UE is instructed to receive CSI-RS transmitted from the node which is selected for reception of the UL transmissions for such UE. That node may not correspond to the node employed for DL transmission of data and/or control channels for that UE. This may happen under various circumstances. One example is heterogeneous deployments where the transmission power for a pico-node is lower than that of the macro-node. In that case, the DL coverage area as given by the CRSs for the pico-node may be limited, and UEs associated to the macro-node as a serving cell might have a lower path loss towards the pico-node. The technology proposed allows such UEs to adjust power control by enabling them to calibrate the transmission power according to CSI-RS transmitted by the pico-node. Similarly, UEs with a smaller path loss towards the macro-node are configured to receive CSI-RS provided from the macro-node.

In this manner, the UEs are able to receive RS transmitted from the network node with the lowest path loss towards the UE, the transmission power for RS may be optimized, resulting in reduced power consumption and interference. Another advantage is that power control for the UEs is based on the available reception point in the network with the lowest path loss, resulting in reduced transmit power at the UE. Yet another advantage is reduced UL interference in the network.

The described method further supports alternative deployments efficiently, something which is not possible according to the 3GPP LTE Release 10 power control scheme. For example, consider a heterogeneous network deployment where several transmission nodes are associated to the same cell-ID. Since CRS patterns are defined by the cell-ID, a 3GPP Release10 UE adjusts UL power control based on RS broadcasted over large parts of the network, resulting in undesirable and uncontrollable UL power control assignments. By configuring the CSI-RS, which the UE conventionally measures for channel estimation targeting CSI feedback, to be used for power control RS for the open loop part of power control, a lower and controlled transmission power is achieved. Another solution in this scenario is to configure multiple CSI-RS resources and use the minimum path loss for power control. This latter approach could be directly incorporated into the power control formula.

In general, different RS resources in the same network may be associated with different reference transmission power values. In order to save DL resources, multiple UEs may be instructed to receive a common set of RSs. To decouple the downlink and uplink, the set of CSI-RS resources to base power control measurements are in one example different from that which is used for channel estimation feedback purposes. For instance, CSI feedback may be provided with a different periodicity and granularity in frequency than the PL measurements. In an example, the transmission of CSI-RS to use for power control purposes are performed in a different manner relative CSI-RS for CSI feedback, e.g., using different periodicity and subframe offset. This means that signalling from e.g. an eNodeB to the UE informing the UE about the specific configuration of CSI-RS resources used for power control needs to be introduced. The sets and sequences of CSI-RS/CRSs to use for path loss measurements are e.g. decided by the network.

Another aspect of the method is the introduction of UE specific PL fractional compensation factors. The term a in the power control equation (1) is in an example adjusted in a UE-specific fashion. Alternatively, a specific compensation factor $\alpha$ is associated to each specific RS resource set. In another example, the specific compensation factor $\alpha$ is associated to the specific transmission point for the RS employed for UL power control. Such a feature is convenient because different RS resources may be associated to different transmission points, each of them experiencing different path loss and deployment properties. The method described above allows for adaptation of the fractional PL compensation even for, e.g. UEs belonging to the same cell but experiencing different propagation and/or interference scenarios and/or associated to different UL reception nodes. Also, the power target setting $P_0$ is in an example done per RS resource.

It should also be observed that UE specific setting of the PL fractional compensation factors and RS power (e.g., respectively $\alpha$ and $P_0$ in the power control equation (1)) may be advantageous even in the case that PL is calculated by the UE based on CRS. In one example the target power for a specific UE may be adjusted by the network by reconfiguration of a combination of the PL fractional compensation factors and RS power. This may be advantageous if a specific UE experiences, e.g., different traffic or propagation conditions than other UEs in the same cell or associated to the same set of RS for PL estimation. In an additional example UE specific configuration of a combination of the PL fractional compensation factors and RS power may be exploited to facilitate power control when the UE is received at a different point than the one transmitting the RS for PL estimation. Such a situation may occur, e.g., if a UE is not able to measure RS from the target reception point, or if such RS are not available, or if the quality of RSRP measurements from such RS is not sufficiently reliable, or during a RS reconfiguration phase. In such case, the network may reduce the effect of PL compensation for such specific UEs, e.g., by reducing the value of $\alpha$ and controlling the transmit power with a combination of $P_0$ and closed loop power control commands. In one example, PL compensation may be implicitly disabled for certain UEs by setting $\alpha=0$ for such UEs. However, any suitable value of $\alpha$ may be used, as it is a session parameter. Hence, $\alpha$ may take other suitable values than zero.

Several RS resources may be configured to be measured on and combined. The combined transmission power may be done in several ways. In an example, it is combined at the PL calculation, such as selecting the minimum PL estimation from the set of RS resources in the set. This example is appropriate with the heterogeneous network scenario with multi-cell reception in the uplink adjusting the power to be enough for the closest cells to achieve good reception. To allow for individual $\alpha$ setting for each RS within the set, the combining is e.g. done at the resulting transmission power setting. For example, the minimum transmission power P is selected from the resulting transmission power levels from all RSs in the set. Instead of minimum path loss or power, weighted algorithms are used.

In an example application, a scheduling unit in the network optionally uses the technology described to enhance UL power control flexibility by adjusting the reference CSI-RS power assumed by a certain UE, without necessary modifying the corresponding actual transmit power. By doing so, an offset in the estimated PL at a given UE is implicitly introduced.

Another non-limiting example application is the simultaneous transmission of a given CSI-RS from multiple transmission points which are potentially suitable for reception of the UL signal for the considered UE (e.g., for UL multipoint reception). The power control for the UE results is based on an equivalent composite channel which in an example is configured in a UE-specific fashion.

Embodiments herein also relate to a UE configured for transmission power control of uplink transmissions. The UE has the same technical features, objects and advantages as the method perform therein described above. The UE will consequently be described in brief in order to avoid unnecessary repetition.

Figure 10:
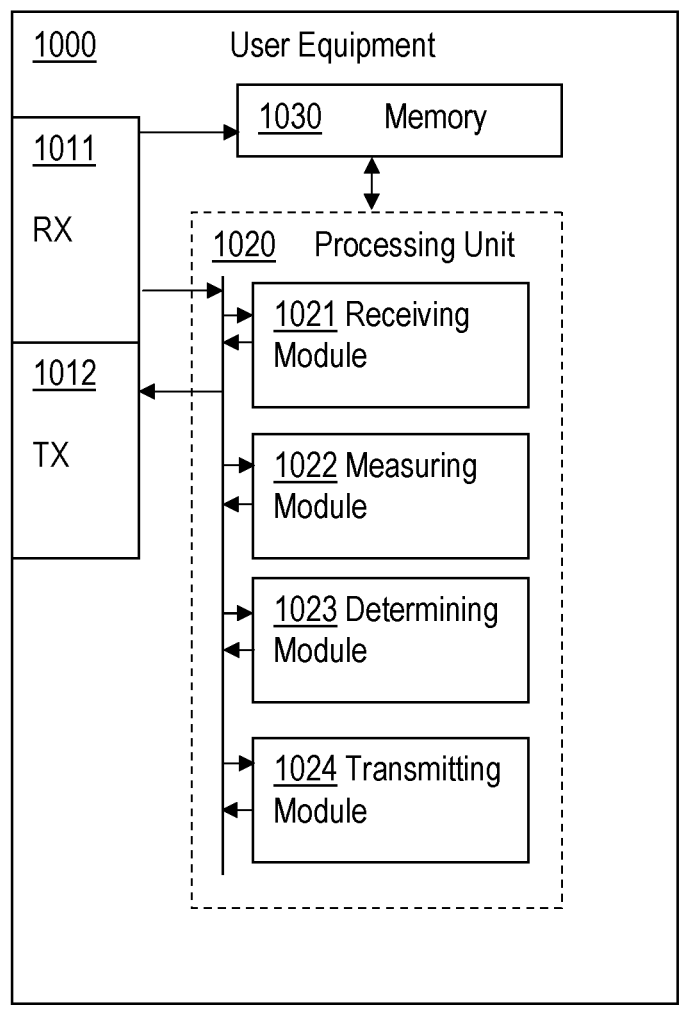
FIG. 10 is a block diagram illustrating a UE for control of uplink transmissions according to an exemplifying embodiment.

FIG. 10 is a block diagram illustrating a UE for control of uplink transmissions according to an exemplifying embodiment. FIG. 10 illustrates the UE 1000 comprising a receiving module 1021 adapted to receive a configuration indicating at least one reference signal, RS and a reference transmission power level for each indicated RS. The UE 1000 further comprises a measuring module 1022 adapted to measure received power of the indicated at least one RS; and a determining module 1023 adapted to determine a pathloss, PL, based on the measured received power and the reference transmission power level for each measured received power. The determining module 1023 further is adapted to determine an uplink transmission power based on at least one determined PL.

The UE has several advantages. For example, the UE decouples uplink power control from the downlink CRSs and provides a flexible way for the network to control how the UEs should set the transmit power. Another advantage is that significant area splitting gains may be attained by controlling the transmit power towards the node that has the lowest (or at least a lower) path loss. Transmit power may be reduced and interference to the own and other cells may be minimized, enabling increased possibilities for spatial division multiple access and improved UE battery lifetime.

FIG. 10 is an exemplifying illustration of the UE 1000. The UE may comprise additional or other modules and/or units than illustrated in FIG. 10. FIG. 10 illustrates the UE further comprising a receiving arrangement 1011 and a transmitting arrangement 1012. These arrangements may be one and the same or it may comprise several individual units or devices. For example, the two arrangements 1011 and 1012 may comprise one or more antenna arrangements by means of which the UE communicates with e.g. a node, point or RBS.

According to an embodiment, the determining module 1023 is adapted to determine an uplink transmission power, by determining a combined PL based on all determined PLs and to determine a transmission power based on the combined PL.

According to yet an embodiment, the determining module 1023 is adapted to determine combined PL by selecting the minimum PL among the determined PLs.

In an example, the RS or RSs comprise RS(s) that correspond to RS patterns also used for Channel State Information, CSI, feedback.

In still an example, wherein the configuration message indicates at least two RSs to be measured by the UE and a respective reference transmission power level for each of the at least two RSs, wherein the respective RS is associated with a respective separate node, wherein the determining module 1023 is adapted to determine at least two PLs, one for each received RS, and wherein the determining module further is adapted to determine a respective uplink transmission power associated with the at least two RSs based on the determined PLs.

According to yet an embodiment, the determining module 1023 is adapted to determine an uplink transmission power towards one of the nodes by combining the determined PLs and then determining the uplink transmission power towards one of the nodes associated with the at least one RS based on the combined PL.

According to still an embodiment, the determining module 1023 is adapted to obtain the combined PL by identifying the minimum PL among the measured PLs, wherein the UE further comprises a transmitting module 1024 adapted to transmit in uplink, to the node associated with the lowest PL using the determined uplink transmission power based on the minimum PL.

According to still an embodiment, the determining module 1023 is adapted to determine an uplink transmission power towards one of the nodes by combining and weighting the respective transmission powers and then to determine said uplink transmission power towards one of the nodes based on the combined and weighted transmission power.

According to an embodiment, the determining module 1023 is adapted to obtain the combined and weighted transmission power by identifying the minimum transmission power among the respective transmission powers, wherein the UE further comprises a transmitting module 1024 adapted to transmit in uplink, to the node associated with the minimum transmission power at the determined transmission power based on the minimum transmission power.

According to yet an embodiment, wherein the determining module 1023 is adapted to obtain the combined and weighted transmission power by linear summing the measured PLs.

According to still an embodiment, the determining module 1023 is adapted to base the combined and weighted transmission power on the number of antennas or receiver type at each RS transmission point.

According to yet an embodiment, the number of antennas and receiver type is received in the configuration message.

According to an embodiment, the RS or RSs are further used for CSI feedback.

FIG. 10 illustrates the UE 1000 comprising a memory 1030. In an example, the memory 1030 of UE 1000 may for example be a flash memory, a RAM (Random-access memory) ROM (Read-Only Memory) or an EEPROM (Electrically Erasable Programmable ROM), and computer program instructions may in alternative embodiments be distributed on additional memories (not shown) in UE 1000. The processor may or may not only be a single CPU (Central processing unit) 1020, and may comprise two or more processing units in the UE 1000. For example, the processor may include general purpose microprocessors, instruction set processors and/or related chips sets and/or special purpose microprocessors such as ASICs (Application Specific Integrated Circuit). The processor may also comprise board memory for caching purposes.

It should be noted that FIG. 10 merely illustrates various functional units in the UE in a logical sense. The functions in practice may be implemented using any suitable software and hardware means/circuits etc. as briefly described above. Thus, the embodiments are generally not limited to the shown structures of the UE and the functional modules/units. Hence, the previously described exemplary embodiments may be realised in many ways. For example, one embodiment includes a computer-readable medium having instructions stored thereon that are executable by the processing unit 1020 for executing the method steps in the UE. The instructions executable by the computing system and stored on the computer-readable medium perform the method steps of the present invention as set forth in the claims.

While the embodiments have been described in terms of several embodiments, it is contemplated that alternatives, modifications, permutations and equivalents thereof will become apparent upon reading of the specifications and study of the drawings. It is therefore intended that the following appended claims include such alternatives, modifications, permutations and equivalents as fall within the scope of the embodiments and defined by the pending claims.

The invention claimed is:

1. A method in a user equipment, UE, for transmission power control of uplink transmissions, the method comprising:
    receiving, through signalling, a configuration indicating at least one reference signal, RS, and a reference transmission power level for each indicated RS, wherein said RS or said RSs are further used for Channel State Information feedback,
    measuring received power of the indicated at least one RS,
    for each measured received power, determining a pathloss, PL, based on the measured received power and the reference transmission power level, and
    determining an uplink transmission power based on at least one determined PL.

2. A method according to claim 1, wherein determining an uplink transmission power, comprises determining a combined PL based on all determined PLs and determining a transmission power based on the combined PL.

3. A method according to claim 2, wherein determining an uplink transmission power towards one of the nodes comprises combining the determined PLs and then determining said uplink transmission power based on the combined PL.

4. A method according to claim 1, wherein determining the uplink transmission power comprises determining the uplink transmission power based on a minimum PL among the determined PLs.

5. A method according to claim 4, further comprising transmitting in uplink, to a node associated with the lowest PL using the determined uplink transmission power based on the minimum PL.

6. A method according to claim 1 wherein determining an uplink transmission power comprises determining, for each indicated RS, an uplink power based on at least one determined PL, each determined power is towards a respective node.

7. A method according to claim 6, wherein determining an uplink transmission power towards one of the nodes comprises combining and weighting the respective transmission powers and then determining said uplink transmission power towards one of the nodes based on the combined and weighted transmission power.

8. A method according to claim 7, wherein the combined and weighted transmission power is obtained by identifying the minimum transmission power among the respective transmission powers, wherein the method further comprises transmitting in uplink, to the node associated with the minimum transmission power at the determined transmission power based on the minimum transmission power.

9. A method according to claim 7, wherein the combined and weighted transmission power is obtained by a linear sum of the measured PLs.

10. A user equipment, UE, configured for transmission power control of uplink transmissions, the UE comprising:
    a receiving module adapted to receive a configuration indicating at least one reference signal, RS, and a reference transmission power level for each indicated RS, wherein said RS or said RSs are further used for Channel State Information feedback,
    a measuring module adapted to measure received power of the indicated at least one RS,
    a determining module adapted to determine a pathloss, PL, based on the measured received power and the reference transmission power level for each measured received power,
    wherein the determining module further is adapted to determine an uplink transmission power based on at least one determined PL.

11. A UE according to claim 10, wherein the determining module is adapted to determine an uplink transmission power, by determining a combined PL based on all determined PLs and to determine a transmission power based on the combined PL.

12. A UE according to claim 11, wherein the determining module is adapted to determine an uplink transmission power towards one of the nodes by combining the determined PLs and then determining said uplink transmission power towards one of the nodes associated with the at least one RS based on the combined PL.

13. A UE according to claim 11, wherein the determining module is adapted to determine an uplink transmission power towards one of the nodes by combining and weighting the respective transmission powers and then to determine said uplink transmission power towards one of the nodes based on the combined and weighted transmission power.

14. A UE according to claim 13, wherein the determining module is adapted to obtain the combined and weighted transmission power by identifying the minimum transmission power among the respective transmission powers, wherein the UE further comprises a transmitting module adapted to transmit in uplink, to the node associated with the minimum transmission power at the determined transmission power based on the minimum transmission power.

15. A UE according to claim 13, wherein the determining module is adapted to obtain the combined and weighted transmission power by linear summing the measured PLs.

16. A UE according to claim 10, wherein the determining module is adapted to determine selected PL by selecting the minimum PL among the determined PLs.

17. A UE according to claim 16, wherein the UE further comprises a transmitting module adapted to transmit in uplink, to a node associated with the lowest PL using the determined uplink transmission power based on the minimum PL.

18. A UE according to claim 10, wherein the determining module is adapted to determine an uplink transmission power by determining, for each indicated RS, an uplink power based on at least one determined PL, each determined power is towards a respective node.

* * * * *

UNITED STATES PATENT AND TRADEMARK OFFICE
CERTIFICATE OF CORRECTION

PATENT NO. : 9,253,731 B2  
APPLICATION NO. : 14/124920  
DATED : February 2, 2016  
INVENTOR(S) : Parkvall et al.

It is certified that error appears in the above-identified patent and that said Letters Patent is hereby corrected as shown below:

On The Title Page,

Column 1, below Title, insert Item -- (71) Applicant: Telefonaktiebolaget L M Ericsson (publ), Stockholm (SE) --.

Column 1, below Title, delete Item "(75)" and insert Item -- (72) --, therefor.

In The Specification,

In Column 14, Line 43, delete "a in the" and insert -- α in the --, therefor.

Signed and Sealed this  
Twenty-first Day of June, 2016

Michelle K. Lee  
*Director of the United States Patent and Trademark Office*